March 25, 1952   B. WARCHALOWSKI   2,590,589
AIRPLANE WITH AUXILIARY LIFT MEANS
Filed Feb. 25, 1949   4 Sheets-Sheet 1
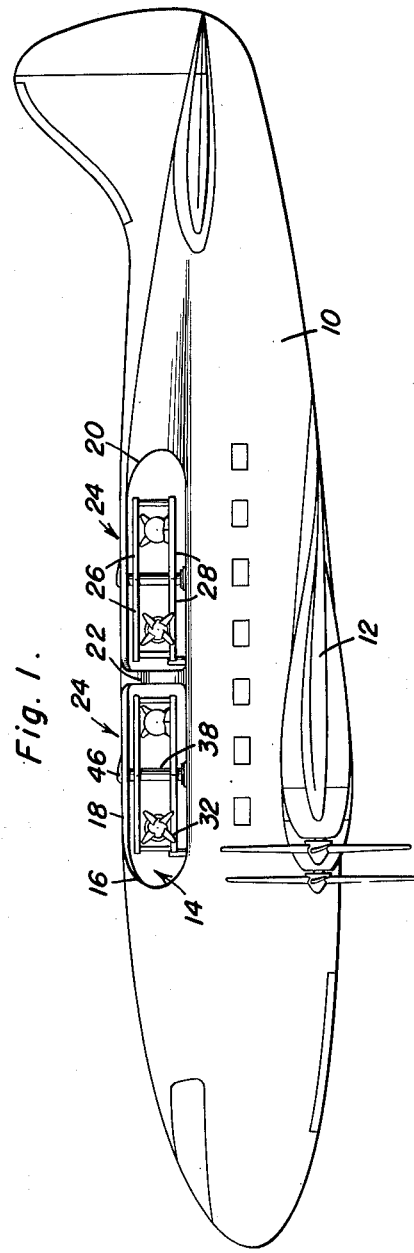
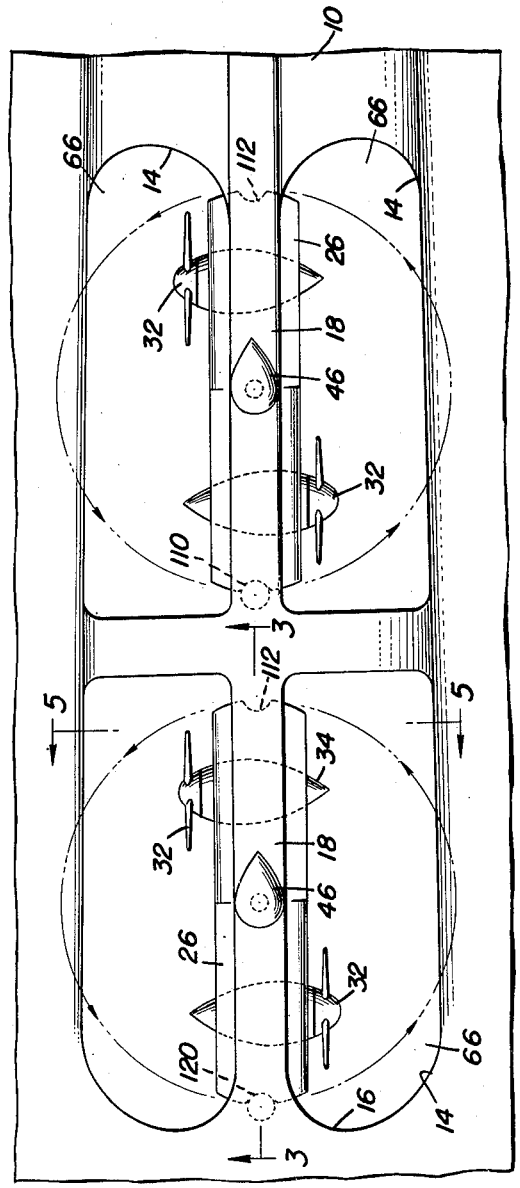
Boleslaw Warchalowski
INVENTOR.

March 25, 1952   B. WARCHALOWSKI   2,590,589
AIRPLANE WITH AUXILIARY LIFT MEANS
Filed Feb. 25, 1949   4 Sheets-Sheet 2
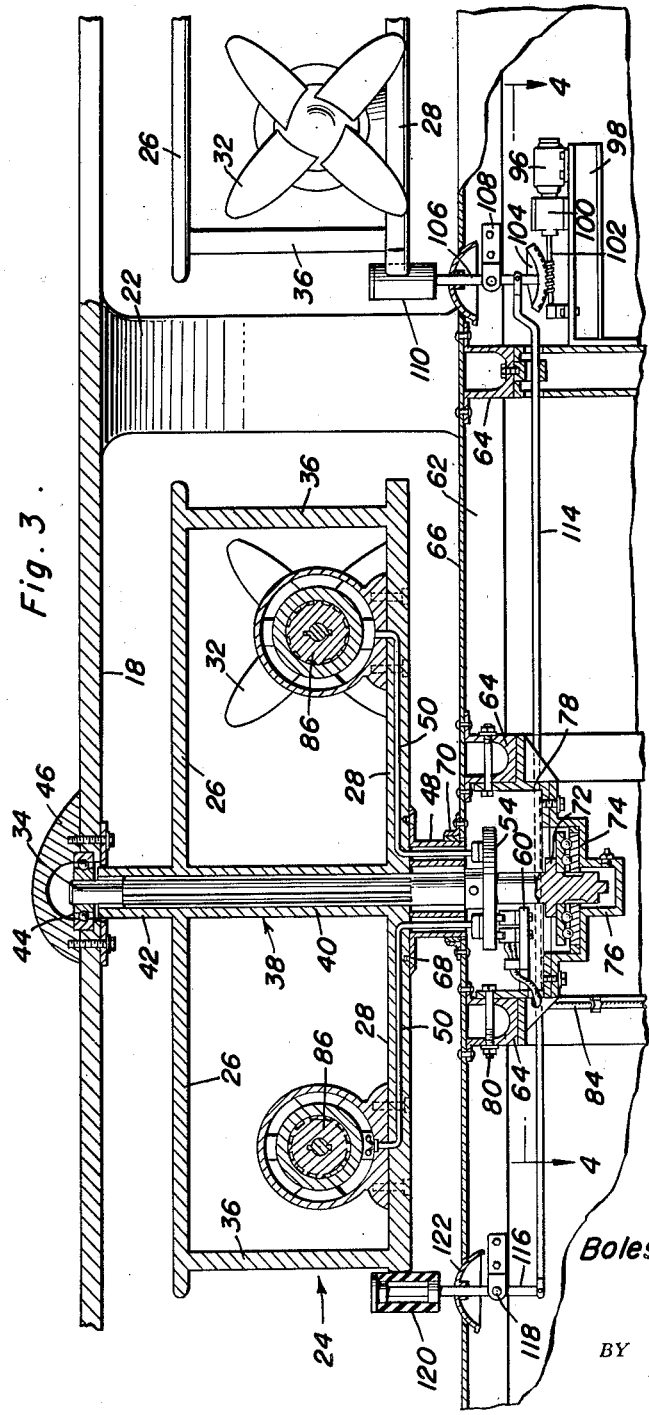
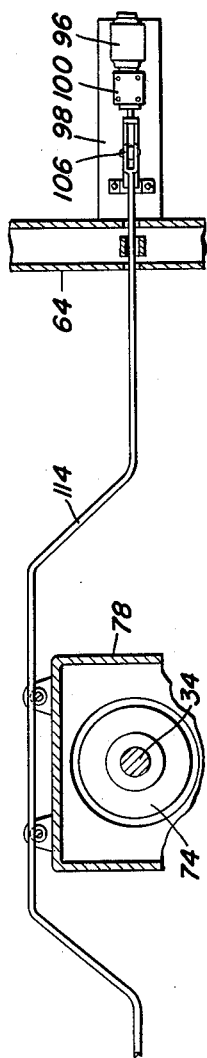
Boleslaw Warchalowski
INVENTOR.

March 25, 1952     B. WARCHALOWSKI     2,590,589
AIRPLANE WITH AUXILIARY LIFT MEANS Filed Feb. 25, 1949     4 Sheets-Sheet 3

Boleslaw Warchalowski
INVENTOR.

March 25, 1952  B. WARCHALOWSKI  2,590,589
AIRPLANE WITH AUXILIARY LIFT MEANS
Filed Feb. 25, 1949  4 Sheets-Sheet 4

Boleslaw Warchalowski
INVENTOR.

BY *Clarence A. O'Brien*
*and Harvey B. Jacobson*
Attorneys

Patented Mar. 25, 1952

2,590,589

UNITED STATES PATENT OFFICE 2,590,589

AIRPLANE WITH AUXILIARY LIFT MEANS

Boleslaw Warchalowski, Amsterdam, N. Y., assignor of forty-five per cent to Thomas Lorenc, Herkimer, N. Y.

Application February 25, 1949, Serial No. 78,366

2 Claims. (Cl. 244—6)

This invention relates generally to aircraft, and more particularly to lift means which will ordinarily be employed as auxiliary lift means in emergency landings and in take-off.

In brief, the invention is comprised in the combination with a fuselage of a plane of a recessed portion in this fuselage, and what will be hereinafter referred to as a quadrafoil, mounted either singly or in multiple, within the recess and including motor-driven airscrews operatively mounted preferably upon the lower oppositely disposed airfoils of the quadrafoil, so that the air stream resulting from actuation of each airscrew is normal to the leading edge of each of said lower airfoils.

A primary object of this invention is to provide auxiliary lift means for use in assisting in emergency and other landings and during take-off.

Another object of this invention is to incorporate this auxiliary lift means with an aircraft in such manner that the drag on the aircraft is not materially increased due to such incorporation during the normal operation of the aircraft.

Still another object of this invention is to provide auxiliary lift means which may be incorporated with different portions of the aircraft, although the preferred location and arrangement is illustrated in the drawings and described in the following specification, it being preferred that two quadrafoils be mounted in tandem, that is, longitudinally of the plane, and substantially vertically above the wings so that the balance of the aircraft is not greatly disturbed due to the incorporation of this invention with the aircraft and the operation thereof.

And a last object to be mentioned specifically is to provide means of the character mentioned above which will be relatively inexpensive and practicable to manufacture, which greatly increases the safety wherewith aircraft may be operated, which is simple and convenient to operate, and which will give generally efficient and durable service.

With these objects definitely in view, this invention resides in certain novel features of construction, combination and arrangement of elements and portions as will be hereinafter described in detail in the specification, particularly pointed out in the appended claims and illustrated in the accompanying drawings which form a material part of this application, and in which:

Figure 1 is a side elevational view of an aircraft with this invention incorporated thereon, the two quadrafoils being illustrated as in locked position, the position in which these quadrafoils will be maintained during the normal flight of the aircraft;

Figure 2 is a fragmentary top plan view showing a portion of the fuselage recessed to accommodate the quadrafoils, and indicating generally how the same may be mounted;

Figure 3 is a vertical transverse sectional view, taken on the line 3—3 in Figure 2, and including a portion of the rear quadrafoil and contiguous structure illustrated in side elevation;

Figure 4 is a fragmentary view showing a portion of the servo-motor actuated brake mechanism, the view being a horizontal section taken substantially on the line 4—4 in Figure 3;

Similar characters of reference designate similar or identical elements and portions throughout the specification and throughout the several views of the drawings.

Figure 5:
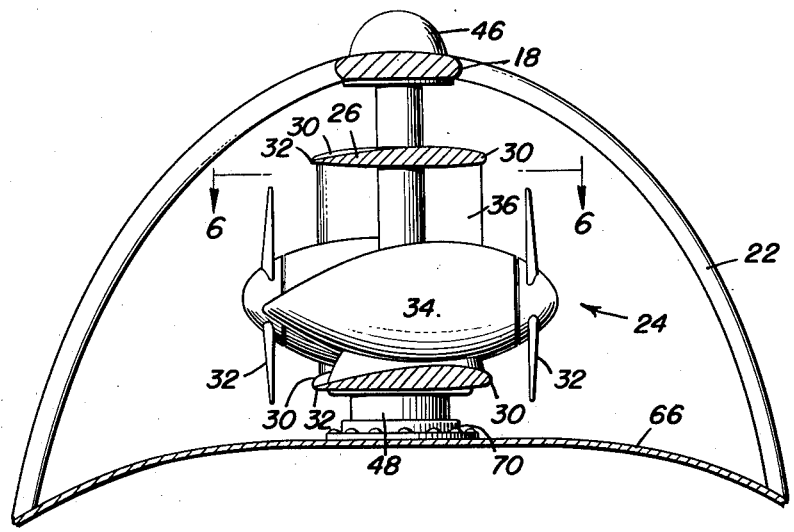
Figure 5 is a transverse vertical sectional view taken substantially on the line 5—5 in Figure 2.
Figure 6:
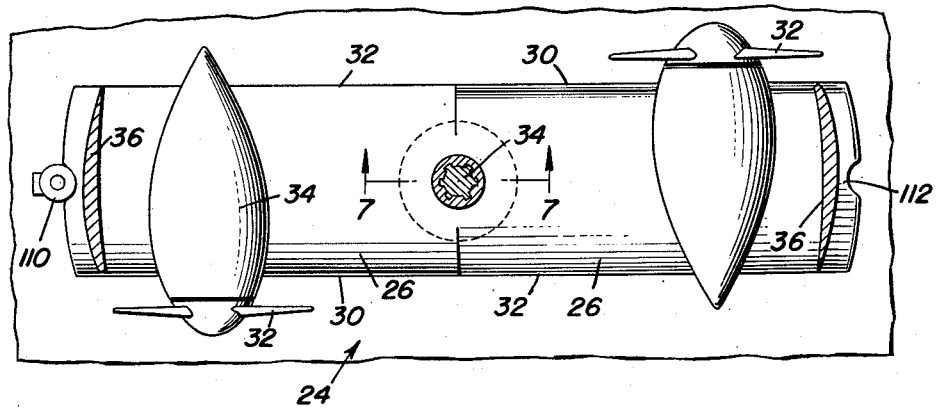
Figure 6 is a horizontal sectional view taken on the line 6—6 in Figure 5.
Figure 7:
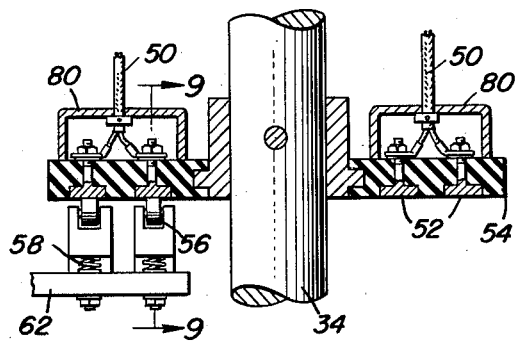
Figure 7 is an enlarged vertical sectional view taken on the line 7—7 in Figure 6.
Figure 8:
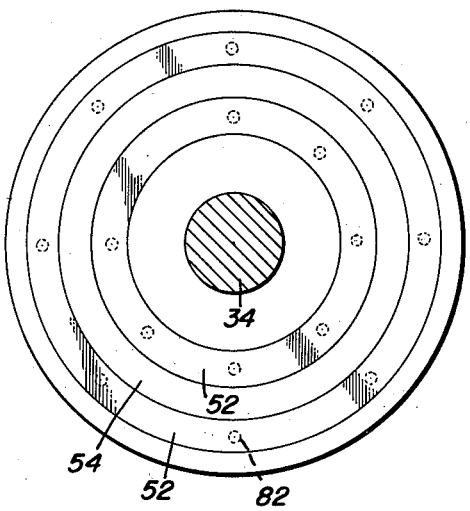
Figure 8 is a lower plan view of the collecting ring structure carried by the vertical shaft of each quadrafoil.

Referring now to the drawings in detail, this invention is adapted to be used with an environment including various types of aircraft, including a low wing type illustrated in Figure 1 as having a fuselage 10, conventional wings 12 with engines and propellers carried thereon. The upper central portion of the fuselage 10, substantially vertically above the wings 12, is recessed, as at 14, the skin of the fuselage being continued upwardly as at 16, preferably in a curved line for integral and flush connection with a longitudinally disposed top support 18, which will be preferably coplanar with the adjacent top portions of the fuselage. The rear curved edge 20 of the recess is similarly led from the rear end of the top support 18 to merge with the contiguous portion of the fuselage. A transversely disposed supporting brace 22 will be provided to support the top support 18 at its central point, when two quadrafoils are incorporated with the aircraft. The term "quadrafoil" will be used to indicate each of the two assemblies referred to by the numeral 24 and comprised of two upper airfoils 26 and two lower airfoils 28. The upper airfoils are oppositely disposed, that is, the leading edge 30 of each of the upper airfoils is substantially co-linear with the trailing edge 32 of the upper airfoil disposed on the opposite side of the vertical shaft 34. Similarly, the leading edges and trailing edges of the lower airfoils are oppositely disposed on opposite sides of the shaft 34. This arrangement will be clearly understood from an inspection of Figure 5 and the construction is substantially that of a pair of vertically spaced parallel single blade propellers. Each of the lower airfoils carries a motor-driven airscrew 32, the motor being generally indicated at 34 as housed within a streamlined cowling. The upper and lower airfoils are connected by vertical strut members 36 which will preferably be streamlined as best indicated in Figure 6, while the airfoils are all connected to a vertical sleeve bearing 38 having a central portion 40 securable on the vertical shaft 34 so as to turn therewith, and an upper portion 42 extending above the upper airfoils 26. The upper end of the shaft 34 and this outwardly extending portion 42 of the bearing 38 are mounted for rotation within a bearing 44 carried by the top support 18, the details of construction of this bearing being thought unimportant in this application. A blister 46 may be incorporated with the top support 18 to provide for easy access to the bearing 44 for inspection and repair of the same. The airfoils 26 and 28 may be of integral construction with the bearing 38 and another bearing 48 carrying the electric leads 50 may be secured to the central under portion of each quadrafoil. The electric leads 50 connect the motors of the airscrews to the collecting rings 52, illustrated in Figures 7 and 8, the latter being carried on a disk 54 on an intermediate portion of the shaft 34. Brushes of roller type 56 are resiliently mounted as indicated at 58 on an angle bracket 60 which is, in turn, mounted on any adjacent fixed structure of the aircraft such as the bulkhead 64 or stringers 62, or the like. In this connection, it may be noted that a preferred embodiment of this invention illustrated in the drawing provides for the continuation of the skin of the aircraft into the plate 66 covering the fuselage at the recessed portion thereof and extending beneath the quadrafoils. The member 48, when secured to the lower airfoils as at 68 may revolve therewith and within an aperture in the plate 66, this aperture being preferably provided with a reinforcing collar 70 which comprises a bearing member for the member 48.

The shaft 34 may be formed with an annular collar 72 near the lower end thereof and this collar rides upon the bearing 74 which is supported on the bearing hanger 76 carried on angles 78, which are bolted as to 80 to the bulkheads 64. The plate 66 and the transverse member 22 may be also supported directly upon the bulkheads 64.

Figure 9:
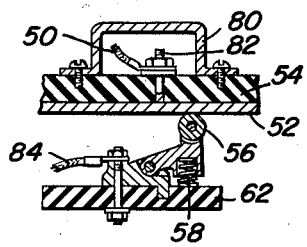
Figure 9 is a vertical sectional view designed to illustrated a practical method of distributing electrical power to the collecting rings illustrated in Figure 8, the figure including representation of a roller brush construction.
Figure 10:
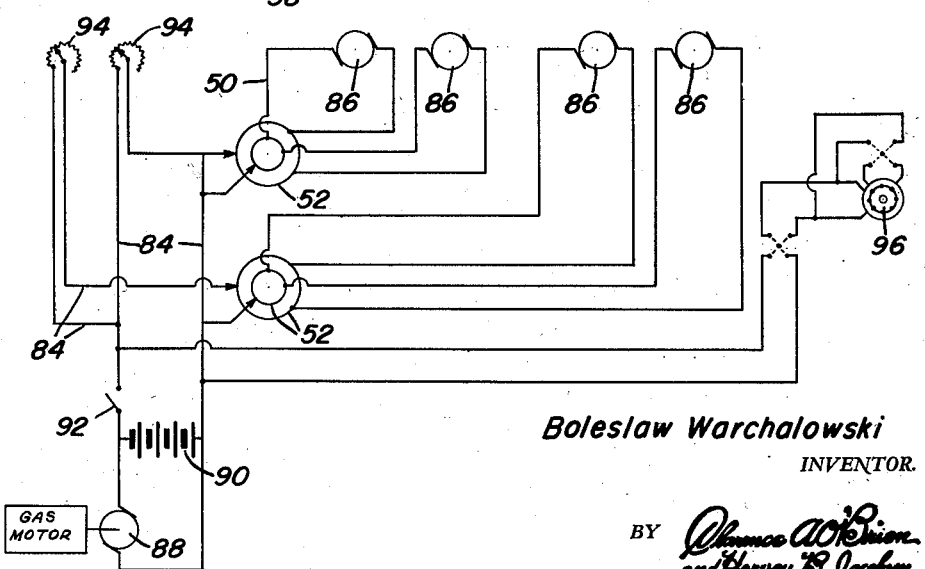
Figure 10 is a diagrammatic representation of the electrical wiring circuit used in connection with the electrical motors for the airscrews.

Figure 9 represents a channel member 80 which is secured to the disk 54 to cover the electrical terminals 82 which comprise bolt members leading from the top of the disk 54 where they are connected to the electric leads 50, through the disk 54 to the respective collecting rings 52 on the under side of the disk. Other electric leads 84 are connected through the roller-type brushes 56 with the collecting rings 52, and if reference be had to Figure 10, it will be clear how the motors 86 are thus operatively connected with the motor-driven generator 88, a battery 90, a master control switch 92, and a speed controlling rheostat 94 being connected in the leads 84, in order that the motors 86 may be powered and driven at the desired speed, the rheostats and master switch 92 being controlled directly or indirectly by the pilot of the aircraft.

In order that the quadrafoils may be braked, a servomotor of reversible type may be mounted, as on brackets 98 carried by the bulkheads 64, and equipped with suitable gear boxes 100, a worm gear 102 and rack 104, which latter pivots the lever 106 about its pivotal connection on another bracket 108, to move a buffer 110 toward and away from the ends of the lower airfoils 28. When the buffer 110, preferably constructed of resilient material bonded in any suitable manner to an upper end of the lever 106, contacts the ends of the lower airfoil 28, the airfoil is quickly reduced in speed, and recesses 112 are formed in the ends of this lower airfoil, so that the quadrafoils may be locked in position, disposed longitudinally of the aircraft, for normal flight of the aircraft. In construction where two quadrafoils are used, an extension rod 114 is led from the lever 106 to a similar lever 116, similarly pivoted as at 118 on a stringer 62 or other fixed structure, and provided with a buffer 120 for braking the other of the quadrafoils. It is preferred that the slots in the plate 66 for the levers 106 and 116 shall be closed by arcuate plates 122 carried on the intermediate portions of the said levers, so as to preserve the fuselage against entrance of moisture at these points. Figure 4 represents how the extension rod 114 may be offset to avoid a bearing construction of one of the lower end mountings for the quadrafoil shafts 34.

The operation of this invention will be clearly understood from the foregoing description of the mechanical details thereof, taken in connection with the drawings and with the recitation of the objects sought to be achieved by this invention. Obviously, many minor variations may be made in the details of construction and the arrangement of the various elements may be departed from without exceeding the scope of this invention. The exact form of the quadrafoils per se may be changed and the devices for controlling the same may also be changed, all within the scope of this invention, which scope should be determined only in accordance with a proper interpretation of the terminology used in the subjoined claims.

Having thus described the invention, what is claimed as new is:

1. Lift means for an aircraft including a quadrafoil comprised of upper and lower parallel airfoils, a motor driven airscrew carried by and operatively associated with said quadrafoil, said quadrafoil being freely rotatably mounted on a vertical shaft supported on an aircraft, and means directly engaging portions of the quadrafoil to brake said quadrafoil and to lock the same in position parallel to the longitudinal axis of the aircraft.

2. Lift means for an aircraft including a quadrafoil comprised of upper and lower parallel airfoils, a motor driven airscrew carried by and operatively associated with said quadrafoil, said quadrafoil being freely rotatably mounted on a vertical shaft supported on an aircraft, means to brake said quadrafoil and to lock the same in position parallel to the longitudinal axis of the aircraft, said means comprising buffers pivoted on said aircraft and frictionally engageable with the outer end portions of one of said airfoils, and recesses in said one airfoil into which said buffers are received when the quadrafoil is arrested in said position.

BOLESLAW WARCHALOWSKI.

REFERENCES CITED

The following references are of record in the file of this patent:

UNITED STATES PATENTS

| Number | Name | Date |
|---|---|---|
| Re. 21,478 | Smith | June 4, 1940 |
| 1,328,211 | Sloan | Jan. 13, 1920 |
| 1,432,787 | Reyes | Oct. 24, 1922 |
| 1,528,943 | Naranjo | Mar. 10, 1925 |
| 1,550,106 | Shaw | Aug. 18, 1925 |
| 1,725,724 | Thomas | Aug. 20, 1929 |
| 1,878,955 | Mantell | Sept. 20, 1932 |
| 2,094,105 | Myers | Sept. 28, 1937 |
| 2,481,502 | Downing | Sept. 13, 1949 |

FOREIGN PATENTS

| Number | Country | Date |
|---|---|---|
| 535,415 | Germany | Oct. 10, 1931 |
| 559,984 | Germany | Mar. 17, 1927 |
| 544,775 | France | July 3, 1922 |
| 933,389 | France | Dec. 17, 1947 |